(No Model.)

J. H. E. DE CELLES.
EYEGLASSES.

No. 553,975. Patented Feb. 4, 1896.

Witnesses
A. C. Whiting
M. J. Galvin

Inventor
J. H. E. De Celles

By his Attorney
John C. Dewey

UNITED STATES PATENT OFFICE.

JOSEPH H. E. DE CELLES, OF SOUTHBRIDGE, MASSACHUSETTS.

EYEGLASSES.

SPECIFICATION forming part of Letters Patent No. 553,975, dated February 4, 1896.

Application filed December 24, 1894. Renewed September 30, 1895. Serial No. 564,231. (No model.)

*To all whom it may concern:*

Be it known that I, JOSEPH H. E. DE CELLES, a citizen of the United States, residing at Southbridge, in the county of Worcester and State of Massachusetts, have invented certain new and useful Improvements in Eyeglasses; and I do hereby declare that the following is a full, clear, and exact description thereof, which, in connection with the drawings making a part of this specification, will enable others skilled in the art to which my invention belongs to make and use the same.

My invention relates to eyeglasses, and to that class of eyeglasses in which the lenses are separated or moved apart in a straight line preparatory to placing them on the nose of the wearer in a straight line.

The object of my invention is to improve upon the construction of the bridge or connection between the lenses and to provide a light and strong bridge which will not yield or bend, but will hold the lenses in the same vertical plane when they are moved away from and toward each other.

My improved bridge is not objectionable in appearance, and the ends of the rods forming the bridge do not project on the outside of the side bars to furnish projecting points, which are liable to catch in the clothing, &c.

My invention consists in certain novel features of construction of the bridge or connection between the lenses, and more particularly in combining with the side bars to form the bridge two tubular rods and two solid rods, adapted to telescope into the tubular rods, as will be hereinafter fully described.

Figure 1:
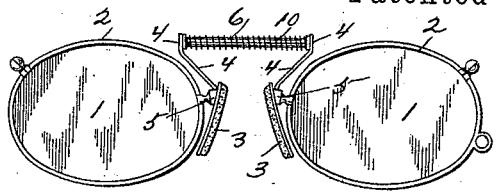
Figure 2:
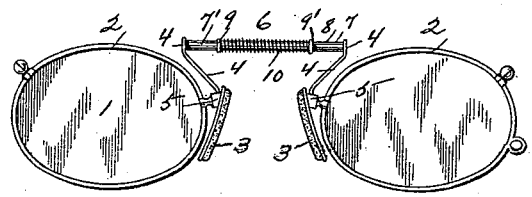
Figure 3:
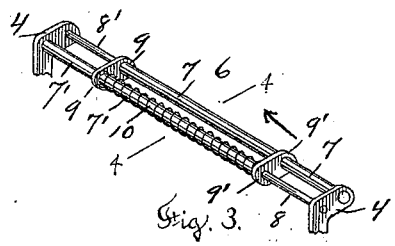
Figure 4:
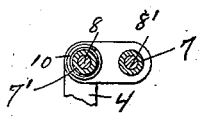

Referring to the drawings, Figure 1 is a front elevation of a pair of eyeglasses provided with a bridge embodying my invention. Fig. 2 corresponds to Fig. 1, but shows the lenses moved apart. Fig. 3 shows, on an enlarged scale, a perspective view of the bridge shown in Fig. 2; and Fig. 4 is, on an enlarged scale, a cross-section on line 4 4, Fig. 3, looking in the direction of the arrow, same figure.

In the accompanying drawings, 1 is the lens; 2, the lens-frames; 3, the nose-guards, and 4 the bridge side bars, which are secured at their lower ends in the clamp-posts 5 and have their upper ends bent away from each other, all in the ordinary way.

The bridge 6, which connects the side bars 4 and enables the lenses 2 to be moved apart in a straight line, consists of two tubular or hollow rods, 7 and 7', and two solid rods, 8 and 8', which are adapted to telescope into said tubular rods. I attach one tubular rod, as 7, and one solid rod, as 8, at their outer ends to one side bar, 4, and the other tubular rod, as 7', and the other solid bar, as 8', at their outer ends to the other side bar, 4, as shown in Fig. 3. A yoke or cross-head 9 is attached to the inner or other end of the tubular rod 7 and is supported and slides loosely on the other tubular rod, 7'. A second yoke or cross-head, 9', is attached to the inner or other end of the tubular rod 7' and is supported and slides loosely on the other tubular rod, 7.

A spiral spring 10 extends between the yokes 9 and 9' and encircles one of the tubular rods, and in this instance the back tubular rod, 7'.

The spring 10 acts to move the yokes 9 and 9' away from each other and cause the solid rods 8 and 8' to telescope into the tubular rods 7 and 7', and thus move the lenses toward each other in a straight line to press and hold the guards 3 on the nose of the wearer.

The advantages of my improved bridge will be readily appreciated by those skilled in the art.

By combining two tubular rods with two solid rods in the manner above described I provide a bridge or connection between the bridge side bars consisting of four rods, which makes a strong and durable bridge, and one which will not give or yield to allow the lenses to move out of their proper vertical plane. At the same time I arrange the four rods in such a way that when the eyeglasses are in position on the nose of the wearer only a single rod appears in case the lenses are moved toward each other, as shown in Fig. 1, and only two rods in case the lenses are moved apart, as shown in Fig. 2.

It will be understood that my improved bridge may be combined with any style of eyeglass-frames.

Having thus described my invention, what I claim as new, and desire to secure by Letters Patent, is—

1. In eyeglasses a bridge or connection between the lenses, comprising four rods, two of which are tubular rods, and two solid rods, said solid rods adapted to telescope into the tubular rods, and one solid rod and one tubular rod attached at their outer ends to the upper end of one bridge side bar, and the other solid rod and tubular rod attached at their outer ends to the upper end of the other bridge side bar, and two yokes or cross-heads, one secured to the inner end of each tubular rod, and adapted to slide loosely on the other tubular rod, and a spring supported on one tubular rod, between said yokes, substantially as shown and described.

2. An extension-bridge for eyeglasses, comprising two pairs of rods, one rod of each pair being a tubular rod, into which the solid rod of the other pair telescopes, and each pair attached at their outer ends to one of the bridge side bars, and a yoke attached to the inner end of each tubular rod, and adapted to slide loosely on the other tubular rod, and a spring supported on one tubular rod between said yokes, substantially as shown and described.

3. The combination with the bridge side bars, of two parallel rods, one of said rods a tubular rod, and the other a solid rod, both attached at one end to one bridge side bar, and two other parallel rods, one of said rods a tubular rod, and the other a solid rod, both attached at one end to the other bridge side bar, and said rods arranged so that the solid rod of one pair will telescope into the tubular rod of the other pair, and a yoke or cross-head secured on the inner end of each tubular rod, and adapted to slide loosely on the other tubular rod, and a spring extending between said yokes, substantially as set forth.

4. In eyeglasses, the combination with the bridge side bars, of the bridge or connection between said side bars, consisting of four rods arranged in the same horizontal plane, two of said rods being tubular rods, and the other two solid rods, the solid rods adapted to telescope into the tubular rods, and one solid rod and one tubular rod attached at their outer ends to one bridge side bar, and the other solid rod and tubular rod attached at their outer ends to the other bridge side bar, and two yokes or cross-heads, one secured to the inner end of each tubular rod, and adapted to slide loosely on the other tubular rod, and a spring supported on one tubular rod, between said yokes, substantially as shown and described.

JOSEPH H. E. DE CELLES.

Witnesses:
FRANK D. FOLEY,
C. A. PAIGE.